United States Patent [19]
Teague

[11] Patent Number: 5,130,019
[45] Date of Patent: Jul. 14, 1992

[54] MUD CLEANING APPARATUS FOR REMOVING SAND, SHALE, AND OTHER DEBRIS FROM DRILLING MUD

[76] Inventor: J. T. Teague, 103 The Trees, Clinton, Okla. 73601

[21] Appl. No.: 665,695

[22] Filed: Mar. 7, 1991

[51] Int. Cl.$^5$ ............................................. B01D 33/03
[52] U.S. Cl. ................................... 210/247; 210/344
[58] Field of Search ................ 209/309, 350; 210/247, 210/330, 344

[56] References Cited

U.S. PATENT DOCUMENTS

| | | | |
|---|---|---|---|
| 176,192 | 4/1876 | Nilson et al. | 209/309 |
| 279,286 | 6/1883 | Sutton | 209/350 |

*Primary Examiner*—Frank Spear
*Attorney, Agent, or Firm*—Gunn, Lee & Miller

[57] ABSTRACT

A mud cleaning apparatus is set forth and has an upstanding cylindrical housing supported by a frame work with legs. There is a mud inlet line at the top of the housing. Centrally, a motor drives a drive shaft extending vertically in the housing and supporting cascaded circular screens which are rotated. Each screen has mesh openings to remove particles of particular size and mud flows through that screen into a funnel there below and is directed by the funnel into the next screen. Typically, three screens and three funnels are included wherein the bottom funnel connects with an outlet mud line to remove the clean mud. Trash removed from mud flow collects on the screens which are rotated, and such motion couple with vibration imparted to the screens causes the trash to migrate across the screens for ejection from the screens and accumulation in the bottom of the cylindrical housing and removal on a conveyor system.

17 Claims, 2 Drawing Sheets

MUD CLEANING APPARATUS FOR REMOVING SAND, SHALE, AND OTHER DEBRIS FROM DRILLING MUD

BACKGROUND OF THE DISCLOSURE

In the drilling of wells, a drilling fluid (called mud) is circulated downwardly through the drill strings, flows out through the drill bit, and returns to the surface in the annular space around the drill string within the drilled hole. The drilling fluid is delivered under substantial pressure at large flow rates by a mud pump into the drill stem, circulates along the path just described, and is reclaimed at the surface where it emerges from the annular space around the drill string. The mud is then returned to mud pits or tanks for storage for subsequent recycling. Drilling fluid is expensive to make. Even though a major portion of it is normally water, the drilling fluid costs in drilling in a deep well are not trivial. Rather, the cost can be substantial and to this end, it is desirable to recirculate the drilling fluid. One purpose of the drilling fluid is to remove cuttings from the vicinity of the drill bit as it penetrates various formations of the earth. These cuttings are flushed away from that area by the large volume of drilling fluid. The drilling fluid carries the cuttings back to the surface of the well. Ultimately, the cuttings must be removed even though the drilling fluid is circulated back into the well. Various and sundry devices have been provided heretofore for use in clearing the drilling fluid. As a generalization, these devices have been called "desanders" or "shale shakers". They typically use screens to filter the flow, or alternately some type of sedimentation approach to remove cuttings.

The present disclosure is directed to a device for removing the cuttings from the mud flow. The mud flow is thus returned to the surface and is directed through a mud flow line to the apparatus of the present disclosure. The mud at this point in time must be presumed to include cuttings of all sizes and shapes. That is, some can be as small as sand particles and other pieces can be larger. While this is a matter of scale, it is typical that the cuttings fall into a specific size range which is dependent on the drilling speed, the type of drill bit being used, the weight of the drill stem on the bit, and the type of formation being drilled. Moreover, the mud flow may be gas cut, meaning natural gas from a pentroleum bearing formation has been entrained in the mud flow, and that tends to reduce the weight of the mud and alters its capacity for carrying drill bit cuttings.

This apparatus is a system for removing particulate material from the drilling fluid. The mud that is returned to the surface is delivered to the area where this equipment is operated. In an ordinary situation, it is desirable to use duplicate sets of this equipment so that one is always available for sevice. While one is in service, the other can be shut down momentarily or is taken out of service so that the sceeens in it can be changed from one size to another, or other maintenance be implemented, for example, inspection of the cuttings, etc. Whatever the reason, duplicate sets of equipment are normally preferred so that each of the two sets of equipment can handle the maximum mud flow anticipated in a specific drilling situation.

The present apparatus is a screened rotation system which utilizes a combination of circular screen and rotational speed to catch a selected set of particulates, remove them from the mud stream, and additionally throw them to the side so that the particulate material removed from the mud flow is separated and can be delivered by a suitable conveyer system away from the mud. The mud is filtered through two or three screens which can have the same screen size or which alternately can have different sizes. It is desirable to classify the particles by screen size, and when that is done, the screens progressively have smaller openings. Thus, the mud flow will pass through a first screen which has relatively large openings, a second with intermediate openings, and the mesh in the third screen will be much smaller.

Multiple screen passes have sometimes been difficult to implement. The present apparatus however enables mud cleaning with a series of screens which are stacked one over the other and which are supported on a common central stem having a central drive shaft. The particles are caught on circular screens. The screens are rotated and periodically vibrated to cause particles on the respective screens to bounce or dance. As a result of the rotation, the particles migrate outwardly on the screens and ultimately fall off the outer periphery of the respective screens and are collected downwardly into a funnel shaped housing for removal wherein the housing dumps the cuttings onto a conveyer system. Moreover, this system, while rather compact, can handle a fairly high volume of drilling fluid. It continuously rotates the screens so that blinding of the screens as a result of excessive particulate accumulation on the screen is negligible. The constant rotation coupled with periodic vibration helps clear the particulate accumulation to reduce screen blinding.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
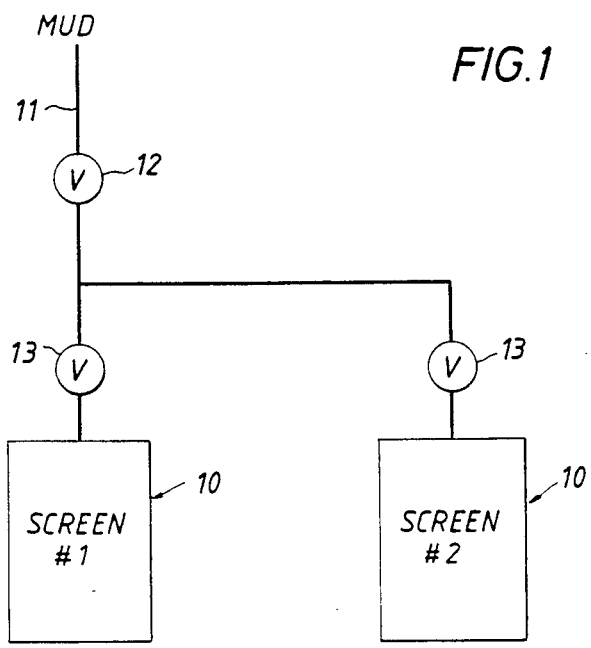
FIG. 1 is a schematic flow diagram of a mud flow system cooperative with duplicate units of the present apparatus so that one is always available for mud cleaning and the other is out of the system.
Figure 2:
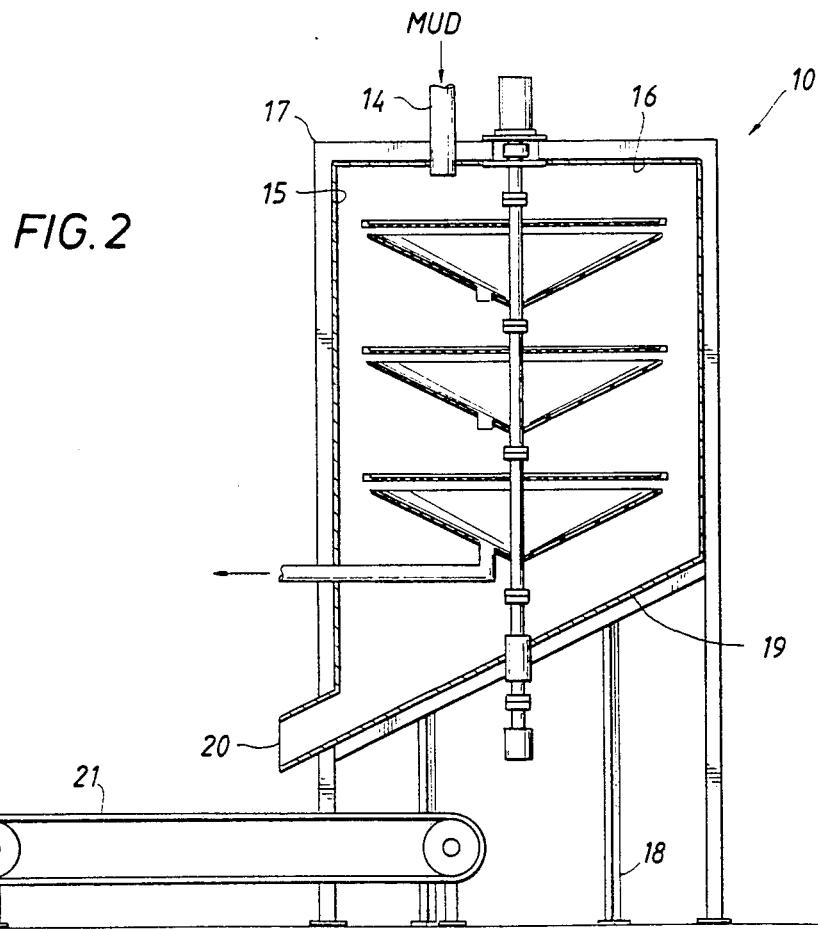
FIG. 2 is a sectional view taken along a diameter of the circular housing enclosing therein a set of vertically stacked screens which are driven by a common drive shaft and further showing a funnel at the bottom of the housing for removal of the particulate material on a conveyer system and also showing how the cleaned mud is removed from the housing.

Attention is directed to FIG. 1 of the drawings where duplicate sets of the present invention are indicated. They are both identified by the reference numeral 10, and they are ideally identical in construction. Duplexing is preferable so that one unit is always available for cleaning the mud. Mud is delivered through the equipment through a mud flow line 11 which delivers the dirty mud to the equipment for particulate removal. The mud flow passes through a first valve 12 and individual valves 13 control mud flow to the mud screening apparatus of the present disclosure. Going now to FIG. 2 of the drawings, the apparatus 10 is illustrated in greater detail. There, the mud is delivered through an inlet pipe 14. The mud is directed to flow downwardly through the pipe 14. It is introduced into a cylindrical housing 15. The housing 15 is an upstanding cylinder having a closed top 16. This will exclude rain water which might otherwise dilute the drilling fluid. The housing 15 is supported by external frame members 17 which include vertical upstanding members which serve as the several legs 18 shown in the lower part of FIG. 2. They support the upstanding cylindrical structure so that it can easily be set up at a drilling site whereby the equipment is substantially enclosed. The housing fully encloses the structure and is an upstanding right cylinder at the upper portions, but it terminates at a sloping surface 19 across the bottom. The surface 19 slopes to function as a funnel which extends downwardly to a funnel outlet 20. The funnel outlet 20 directs particulate material recover onto a conveyer system 21. A belt conveyer or other type of removal device can be used and extends to the side so that the particulate material is moved to a convenient location typically for easy access, for inspection and subsequent disposal.

Figure 3:
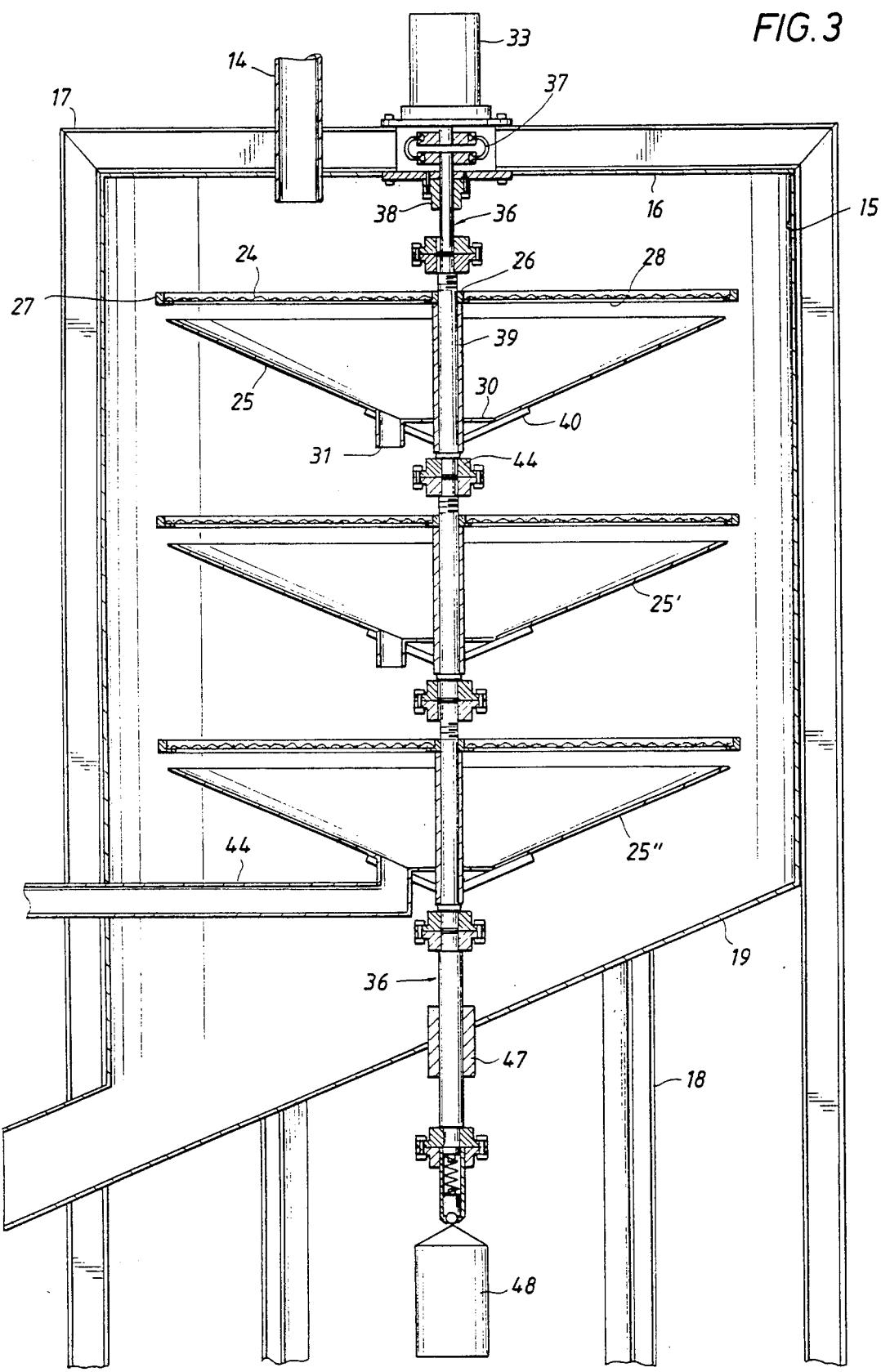
FIG. 3 is an enlarged detailed view structure shown in FIG. 2 illustrating particular details of the drive shaft connecting with the stacked circular screens for imparting rotation to them during operation.

Going now to FIG. 3 of the drawings, the numeral 24 identifies a first circular screen. Since all the screens are structurally identical, there will be assigned a common reference number. However, they may have different size mesh and in that sense, they will function quite differently. More will be explained regarding this. The screen 24 is a circular disk. It extends substantially across the diameter of the cylindrical housing 15. It is positioned immediately above a mud collection funnel 25. The funnel 25 is below the screen so that mud flows readily through the screen 24 into the funnel 25 and is captured. The screen will pass the fluid constituents of the drilling mud, but it will catch any debris which is sufficiently large that it will not pass through the screen 24. The screen 24 is a circular disk. It is supported at its central axis by on a flange of circular construction at 26. In like fashion, there is a peripheral ring 27 which supports the outer edge of the screen. The weight of the mud can bend the screen and to avoid this, a set of radially spokes 28 extend towards the ring 27 to brace the lower side of the screen to prevent sagging. The circular screen equipped with the supports just mentioned is positioned approximately at right angles to mud flow and is operated in a horizontal plane. It intercepts the mud flow to remove large debris. The screen 24 is rotated as will be described so that particulate matter is steadily removed. Observe that the pipe opening 14 is at a particular location. Were the screen stationary, the mesh openings would be blinded immediately below the pipe 14. However, the screen is rotated so that no single spot is blinded. If the rotation were excessively slow, the particulate trash over a period of time would accumulate in the form of a circle which would still inevitably blind the screen in that region. The present apparatus is operated in a fashion to remove the particulate trash so that blinding does not occur in this fashion.

The funnel 25 is located below the screen. Generally, the mud flows through the screen and is captured in the funnel 25. The funnel 25 slopes downwardly to a bottom at 30 and mud is permitted to flow outwardly through a bottom drain pipe 31. The drain pipe 31 is similar in operation to the inlet pipe 14 above the first screen. The drain 31 however directs the mud flow to a second and similar screen. The second screen is identical to the first screen except for selective changes in screen mesh. The removal of debris is duplicated by this set of equipment which utilizes the intermediate screen as shown in FIG. 3 and the intermediate funnel which is below that screen.

There is a third screen also included in the equipment. It is below the second screen, thereby enabling the use of progressively smaller screen mesh in the three screens considered sequentially. As will be understood, the precise number of screens can be varied. Ideally, at least two are used and in some instances, it might be appropriate to use four or five. The optimum appears to be three screens, and more than that appears to have reduced benefits. In any case, the three screens function and operate in very similar fashion as do the three funnels below the three screens. There is however a significant difference in that the bottom funnel is connected with a mud removal line as will be described.

To this juncture, little has been said about the structural supports for the circular screens and the circular funnels below them. This will be considered below in discussing the system for applying rotational movement to the respective screens.

On the top of the equipment, there is a closed and sealed housing 33 which encloses and supports a drive motor. The housing 33 is concentric with the cylindrical housing 15. It drives a long drive shaft assembly 36 through a flexible coupling 37. The coupling 37 is comprised of facing supports which connect together by means of flexible or resilient members which enable shifting axially of the drive shaft 36. The drive shaft 36 is vibrated as will be described. Accordingly, the drive shaft is aligned by means of a bushing 38 found at the top of the housing where the drive shaft 36 extends through the bushing. The drive shaft connects with or to the circular screen support 26 previously identified to impart rotation to the top screen 24. Preferably, the drive shaft 36 is enclosed within a sleeve 39 which is located below the screen. This helps exclude drilling fluid from contact against the drive shaft. The sleeve 39 helps keep drilling fluid off the drive shaft when the mud accumulates to some depth in the funnel 25.

The sleeve 39 extends through the bottom 30 of the funnel 25. To the extent that weight is placed on the funnel 25, reinforcing ribs 40 are also included on the bottom side of the funnel to add strength. The protective sleeve cannot slide down the drive shaft because it is supported above a drive shaft flange 44'. Moreover, the shaft 36 extends below the first screen and its cooperative funnel and passes through the second screen and its funnel also. They are constructed in identical fashion. The same is true of the third screen and its cooperative funnel.

Regarding rotation, the three screens are driven to rotate at the same speed. They are connected with the drive shaft 36 for rotation. To this end, this drive shaft is either journaled or keyed as appropriate to impart rotation to the screens. It is not particularly important whether the top funnel rotates or does not rotate. It is a matter of indifference of the filtering process whether or not the top funnel is fixed or rotative. However, the top funnel can be fixed and made stationary by means of radially extending support ribs connecting to the nether side of the funnel and extending outwardly to the housing 15 as a means of anchoring the funnel against rotation and to additionally provide structural stability as desired. Such an arrangement can be optionally included or omitted for the top funnel and the intermediate funnel. FIG. 3 however shows the bottom funnel to include a lateral mud line 44 which connects to a mud line and extends inwardly of the housing 15 for connection to the funnel. This mud line 44 is fixed in position to remove the filtered mud. It connects with the bottom funnel 25" while the intermediate funnel is identified as 25', this notation distinguishing the three funnels as a function of location. That is, the three screens are identical, and the three funnels are identical except that the funnel 25" is not permitted to rotate. It is held against rotation by its connection to the mud pipe 44 and also by means of supportive ribs extending to the cylindrical housing 15 which ribs have been omitted for sake of clarity. As will be understood, each of the funnels can be held stationary; while the bottom funnel is always held stationary, those above it can either be stationary or can rotate, and if rotated, they can rotate at the same or at different speeds.

FIG. 3 further shows how the drive shaft 36 extends downwardly through all three of the screens and the respective funnels and then extends out of the housing through an alignment sleeve 47. There, it connects with a vibrator 48. The vibrator 48 periodically bumps the drive shaft 36 upwardly. This periodic bump is imparted to all three of the screens. Recall that a flexible coupling 37 is installed at the motor 33 at the other end of the drive shaft. This prevents the drive shaft from bumping the motor. In any case, the drive shaft is oscillated periodically which assists in debris removal. Assume for purposes of an example that the drive shaft 36 is bumped once per second and has a travel of approximately ½ inch. Assume further that it is rotated at a speed between perhaps 20 to 120 rpm. As the screens are then rotated at the indicated speed, they will periodically bounce; that is, they will move upwardly and downwardly with a sharp movement. This sharp bouncing movement will typically dislodge some, and usually practically all, of the particles collected on the screens. The particles will bounce upwardly and/or simultaneously are thrown outwardly as a result of circular rotation from the drive shaft 36. During a few revolutions, the particles will migrate outwardly to the edge of the circular screens and will be thrown to the exterior. They are thrown against the surrounding cylindrical wall 15 and are directed downwardly, falling by gravity, to the sloping bottom 19 and are then guided out of the housing through the debris opening 20 shown in FIG. 2. The particles then fall on the conveyer system and are readily removed.

During operation, the particle removal process just mentioned is carried out by all three of the screens. The actual speed of rotation and the length of stroke for the vibrator 48 are scale factors that can be varied. These scale factors relate to the size of the particles that are removed by the three screens. As will be understood, the particles are classified by size if the screens have different sizes. In the preferred mode of application, the top screen is provided with the largest openings, and the bottom screen has the smallest openings. Accordingly, the trash in the mud string is removed with all three screens cooperatively removing the particulate matter which is then dumped to the side and removed.

As the mud flow rate increases, there is the possibility that the mud will overflow any particular funnel. It is desirable therefore to size the inlet opening 14 as well as the funnel outlet 31 to assure that there is little risk of choking the flow from any of the funnels. If mud does overflow the top funnel 25, it will typically flow down the bottom side of the funnel and will be directed into the next screen and the funnel 25 below it. By this means, overflow at the top is not particularly troublesome. It is however desirable that the bottom most funnel capture all the drilling mud so that it can be removed and is not comingled with the particulate material which is segregated by the present device. Thus, the pipe 44 typically has a diameter sufficiently large to accommodate the flow and sufficient diameter to drain the bottom funnel 25" in rapid order to prevent overflowing.

The present apparatus is uniquely able to remove trash substantially without blinding the screens. Occassionally, a set of particles may be collected over a period of time which will tend to blind on of the screens. This might occur when the particles are shaped so that a few, and ultimately several over time, will plug individual holes in the screen. If that is encountered, it can be remedied either by increasing the stroke of the vibrator which imparts upward oscillatory movement to the drive shaft or alternatively, by periodically taking the equipment out of service and then cleaning the screens to prevent further screen blinding.

The mud line 44 is then connected into the remainder of the mud handling system so that the mud can be recycled time and again in the drilling process. The present equipment can be serviced quite readily. If desired, the cylindrical housing 15 can be provided with a suitable opening formed in it which can be selectively closed but, when opened, enables access to the screens on the interior. The screens normally are circular with a central hole or opening. If desired, they can be cut along a radial line so that they can then be installed around the drive shaft 36. If replacing a screen which is cut in this circumstance, it is desirable to place the radial cut in the screen immediately on top of one of the radial ribs 28 for reinforcing at the cut. Moreover, a radial rib is preferably then placed on top of the screen so that the ribs above and below the screen serve as a clamp to assure that the screen does not form gaps at the cut during rotation.

Operation of the present equipment can continue substanially around the clock. Eventually, and dependent on a number of circumstances such as screen size, formation encountered in the well, size of the particles, and other details, it will be necessary to take the unit out of surface. When this occurs, the unit taken out of service is momentarily switched off and is disconnected from the system. The mud flow is directed to the duplicate unit so that mud filtering continues. For the service procedure, access is gained to the screens. They are visually inspected to assure that sagging has not occurred. Also, they can be serviced simply by selective removal and replacement. Preferably, the represent circular disk which are not connected with the peripheral shoulder 27 or the ribs 28 there below, and in that sense, they can be demounted and replaced. Replacement can be accomplished simply by providing a radial cut provided the two edges at the cut are clamped when installed to prevent leakage. Access to the interior is gained by removal of a portion of the housing 15 which might be demounted and subsequentially installed. It is not necessary to construct the housing 15 of single piece construction so that a portion can then be removed, internal access gained, and service can then be accomplished. The top screen is preferably constructed to remove the larger particles. To this end, the mesh of the screen 24 has quite large openings while the screen 24' has intermediate size openings and the screen 24" has smaller openings. Finally, the screens can, if not bent or sagging, simply be removed along a radial cut line and reinstalled after being inverted. In that instance, any trash that might be caught in a particular mesh opening will be flushed through in the opposite direction and will accumulate on the next screen.

The screens 24 in the present disclosure are thus simultaneously rotated and vibrated vertically. For rotation, one common motor 33 is best used as the power source for all screens especially three which are in the preferred embodiment. The vibrator 48 will effectively operate all the screens to provide vibration, but it also creates a related problem, namely that the mounting of the single rotated shaft be substantially secured by relatively expensive bearings and bushings at two or more locations along the shaft. One alternate approach is to vibrate each screen individually. One convenient way to do this is to mount a vibrator on the inside wall of the cabinet or housing 15. A fixed vibrator mounted on the interior of the housing 15 can readily engage the outer peripheral ring 27 beneath each screen. For instance, an eccentric cam vibrator is manufactured by Globe Manufacturing Company and will suffice for this purpose. Briefly, it contacts the ring 27 and vibrates the ring 27, the screen and the central flange 26. This assures that the screens have a range of excursion vertically. It is not essential that the screens rotate at the precise speed of the central shaft. In fact, it is not essential that one screen rotate at the same speed as the other screens. Rather, what is helpful in the operation of the present apparatus is that the screens rotate continuously, and are subject to vibration. Periodic vibration will suffice, but continued vibration is preferred.

While the foregoing is directed to the preferred embodiment, the scope thereof is determined by the claims which follow.

What is claimed is:

1. Mud cleaning apparatus which removes particulate material from drilling mud, comprising:
   (a) upstanding rotating drive shaft means;
   (b) first and second rotatable trash removing screens rotated by said drive shaft means;
   (c) mud flow means serially directing mud through said first and second screens from above said screens for serial filtering by said screens wherein the mud flows downwardly from the first to the second trash removing screens;
   (d) first and second funnel means deployed below said first and second screens respectively and each of said funnel means having an upwardly opening region for receiving mud flow from said first and second screens and further wherein said funnel means gathers mud flow to direct the mud flow through an outlet mud flow line; and
   (e) a surrounding housing about said drive shaft means, said screens and said funnel means constructed and arranged to collect trash from said trash removing screens wherein said housing collects trash at the bottom thereof by gravity fall.

2. The apparatus of claim 1 wherein said drive shaft means is an upstanding drive shaft and said first and second screens are deployed at vertically spaced positions along said drive shaft means, and wherein said mud flow means is positioned so that mud is introduced through one of said screens into said funnel means, and trash removed from the mud flow accumulates on said screen.

3. The apparatus of claim 1 including means mounting said first screen concentric around said shaft means and including means mounting said funnel means vertically therebelow so that mud flows into said funnel means from said screen.

4. The apparatus of claim 3 including an opening means in said funnel means for directing mud flow from said funnel means to said second screen.

5. The apparatus of claim 1 wherein said screens are circular in shape; and further including means for periodically vibrating said screens during rotation so that particulate trash removed from the mud is bounced, jiggled, and otherwise removed by vibration and rotation during operation.

6. The apparatus of claim 1 further including
   (a) means for repetitively vibrating said screen upwardly;
   (b) wherein said screen is vibrated and rotated repetitively and with sufficient velocity so that trash on said screen progressively moves across said screen and is thrown from said screen;
   (c) said housing is funnel shaped at the bottom thereof to collect trash and including a trash removing means.

7. The apparatus of claim 6 wherein three similar screens are cascaded vertically above first, second and third funnel means to enable serial capture of mud flow after passing through said vertically positioned screens, and said housing surrounds said screens to confine trash thrown from said screens, and said housing directs such trash downwardly for collection by said trash removing means.

8. The apparatus of claim 7 wherein said trash removing means comprises a conveyer system.

9. The apparatus of claim 8 wherein said housing directs trash downwardly so that trash falls by gravity into a housing supported opening directing trash of said conveyer system.

10. The apparatus of claim 9 wherein said said funnel means comprises a fixed funnel below said screens and connects to a mud flow line so that mud is captured thereby and directed into said line.

11. The apparatus of claim 10 further including intermediate mud funnel means below one of said screens to direct mud flows to another of said screens.

12. The apparatus of claim 11 including a motor driven drive shaft operatively connected to said screens to impart rotation thereto.

13. The apparatus of claim 12 incuding vibrator means connected to said drive shaft, and further includes an encircling peripheral frame member connected to plural radial ribs.

14. The apparatus of claim 13 wherein said frame also includes a central ring shaped supportive collar below said screens, and said ribs connect to said collar.

15. The apparatus of claim 14 wherein each of said screens is supported by identical supportive frames.

16. The apparatus of claim 15 wherein each of said collars is connected to said drive shaft.

17. The apparatus of claim 16 wherein said drive shaft is vertically supported and aligned by upper and lower alignment bushings supported by said housing.

* * * * *